(12) United States Patent
Iida et al.

(10) Patent No.: US 6,514,174 B2
(45) Date of Patent: Feb. 4, 2003

(54) SHIFT CONTROL SYSTEM FOR AUTOMATIC TRANSMISSION

(75) Inventors: Toshiji Iida, Fuji (JP); Tateki Jouzaki, Fuji (JP); Tatsuo Ochiai, Fuji (JP); Naoya Inoue, Fuji (JP); Akira Hino, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/920,708

(22) Filed: Aug. 2, 2001

(65) Prior Publication Data
US 2002/0028727 A1 Mar. 7, 2002

(30) Foreign Application Priority Data

Aug. 20, 2000  (JP) .......................... 2000-234252

(51) Int. Cl.$^7$ .............................................. F16H 61/16
(52) U.S. Cl. ........................................ 477/125; 701/52
(58) Field of Search ............................. 477/125; 701/52

(56) References Cited

U.S. PATENT DOCUMENTS

| | | | | | |
|---|---|---|---|---|---|
| 3,927,579 A | * | 12/1975 | Golan | ......................... | 477/125 |
| 4,817,471 A | * | 4/1989 | Tury | ........................... | 477/125 |
| 5,089,965 A | * | 2/1992 | Braun | ......................... | 701/52 |
| 5,545,108 A | * | 8/1996 | Wagner et al. | ............... | 477/125 |
| 6,418,236 B1 | * | 7/2002 | Toukura et al. | ............... | 701/54 |

* cited by examiner

Primary Examiner—Sherry Estremsky
(74) Attorney, Agent, or Firm—Rossi & Associates (57) ABSTRACT

A shift control system for an automatic transmission which has a gear ratio control means for controlling gear ratio of the automatic transmission comprises a lower limit setting device provided in said gear ratio control means and setting a lower limit for inhibiting a gear ratio from changing to a gear ratio of an upshift side; and a lower limit variable control means in which a lower limit of said gear ratio can be changed to a downshift side or to an upshift side by an operation of a driver.

9 Claims, 11 Drawing Sheets

SHIFT CONTROL SYSTEM FOR AUTOMATIC TRANSMISSION

BACKGROUND OF THE INVENTION

1. Field of the Invention

The present invention relates to a shift control system of an automatic transmission for a vehicle.

2. Description of the Prior Art

Japanese Patent Application Laid-open No. 7-301321 discloses an example of a shift control system of an automatic transmission for a vehicle. As disclosed, this conventional system is provided with an automatic shift mode and a manual shift mode. When a manual shift mode is selected, an upshift operation and a downshift operation are performed by the driver's shift operation, and thus gear ratios are continuously controlled by the driver's manual operation. On the other hand, when a shift lever is placed in a neutral position between an upshift and a downshift, a gear ratio is fixed. This makes it possible to adjust driving force and engine braking force continuously and to perform a speed change operation in accordance with the driver's intention.

However, a problem with the aforementioned conventional shift control system of an automatic transmission is that shift operation must be always performed in order to obtain a desired engine speed and driving force while vehicle speed changes variously.

SUMMARY OF THE INVENTION

The present invention has been made in view of the aforementioned problem, and its object is to provide a shift control system of an automatic transmission capable of performing a speed change operation in accordance with intention of a driver and also changing speed without performing a troublesome shift operation.

In order to achieve the above object, according to an aspect of the invention, there is provided a shift control system for an automatic transmission which has a gear ratio control means for controlling gear ratio of the automatic transmission by determining a target gear ratio from a drive point determined on the basis of at least a throttle opening and a vehicle speed, comprising a lower limit setting device provided in the gear ratio control means and setting a lower limit for inhibiting a gear ratio from changing to a gear ratio of an upshift side; and a lower limit variable control means in which a lower limit of the gear ratio can be changed to a downshift side or to an upshift side by an operation of a driver.

In the aspect of the invention, by setting a lower limit of a gear ratio and changing this lower limit by the driver's operation, engine braking force can be optionally obtained and a running in a "D" range can be performed at a lower ratio side than the set lower limit. In the automatic transmission having a conventional manual shift function, shift operation must be always performed in order to obtain a desired engine speed and driving force while vehicle speeds changes variously. On the other hand, according to the invention, even in case a lower limit of a selected gear ratio is set, a normal running in the "D" range can be performed within a range of a lower ratio side than the selected gear ratio, and therefore the driver's shift operation load can be reduced.

In the preferred embodiment, the shift control system may change a control state between first state in which an automatic shift can be performed regardless of the lower limit and second state in which an automatic shift can be performed within a gear ratio range which is not below the lower limit.

As a result, it is possible to perform gear ratio controls that reflect the driver's intention more sufficiently.

Preferably, the lower limit setting device of the gear ratio control means sets a gear ratio at the time of changing from the first state in which an automatic shift can be performed regardless of the lower limit into the second state in which an automatic shift can be performed within a gear ratio range which is not below the lower limit, as the lower limit.

As a result, it is possible to avoid occurrence of shift shocks when the automatic gear ratio control is shifted to the lower limit variable control.

Further preferably, the lower limit variable control means includes a lowest side limiting ratio for restricting a change range of a downshift side of the lower limit, a highest side limiting ratio for restricting a change range of an upshift side of the lower limit and a speed upper limit of a transmission input shaft within a change range of the lower limit, and when a speed of the transmission input shaft reaches the speed upper limit due to a gear ratio selected within the change range, the lower limit variable control means inhibits the lower limit from shifting from the selected gear ratio to a gear ratio of a downshift side, and when a speed of the transmission input shaft exceeds the speed upper limit, the lower limit variable control means shifts the lower limit to a gear ratio of an upshift side that does not cause the speed of said transmission input shaft to exceed said speed upper limit.

As a result, an excessive engine brake can be suppressed, and also a so-called over revolution, that is, a state where the engine rotates excessively, can be inhibited.

Further preferably, the shift control system is equipped with a speed changeable range indicating means for indicating an allowable shift range to a driver when the lower limit variable control means controls a lower limit variably.

As a result, the driver can recognize a position of the lower limit and the allowable shift range.

Further preferably, the shift control system is equipped with a gear ratio selecting means capable of selecting gear ratios by the driver's shift operation, and changeable a lower limit for the lower limit variable control means by the shift operation thereof; and a switching means for switching between a shift control by the gear ratio selecting means according to the shift operation and a shift control by the lower limit variable control means according to the shift operation.

Thereby, since the conventional manual shift device as it is becomes able to be used as a changing device for a lower limit variable control, both operations of a conventional manual range and a lower limit variable control can be performed with one shift lever.

Further preferably, the shift control system is equipped with a selection condition indicating means for indicating whether the lower limit variable control is selected.

As a result, the driver can recognize that a lower limit variable control is selected even during running in the "D" range.

Further preferably, the lower limit variable control means inhibits a lower limit variable control at the time of activation of an anti lock brake system (ABS) for preventing wheels from being locked or slipping due to the drivers hard braking.

As a result, it is possible to prevent the wheels from being locked or slipping due to an excessive engine braking force when the anti-lock brake system is activated.

Still further preferably, the automatic transmission is a continuously variable transmission for selecting gear ratios continuously; and the lower limit variable control means changes a lower limit continuously in case where a lower limit change operation is continued for a certain period of time by the driver at the time of change of a lower limit of a gear ratio.

As a result, the driver can change the lower limit continuously while feeling a desired engine braking force. Since shift operation is limited to the adjustment of engine braking force and others, moreover, this shift operation is not troublesome to the driver.

The above and further objects and features of the invention will be more fully apparent from the following description when the same is considered with reference to the accompanying drawings.

DETAILED DESCRIPTION OF THE PREFERRED EMBODIMENT

Here will be described the embodiment of the invention with reference to the accompanying drawings.

Figure 1:
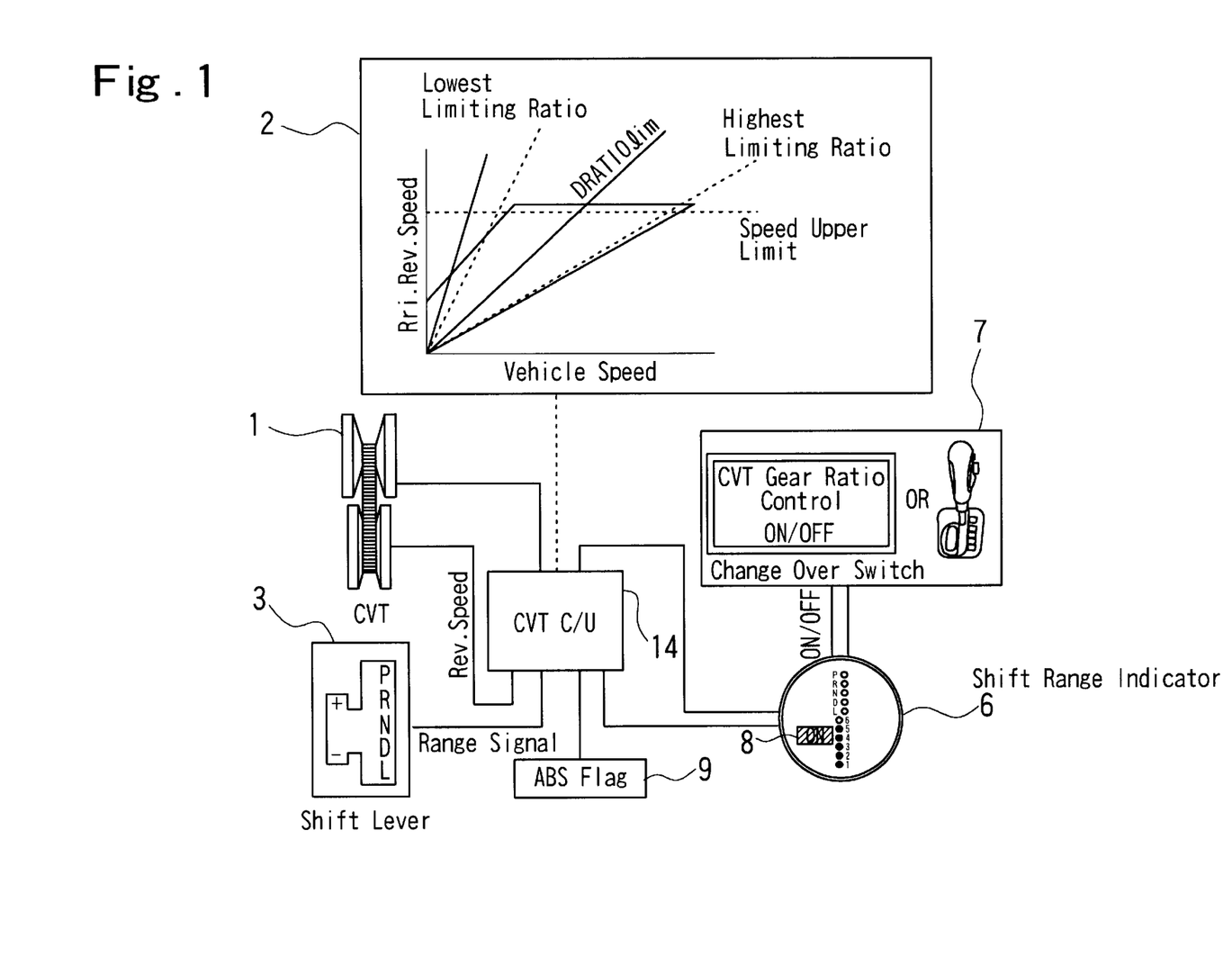
FIG. 1 is a block diagram showing a system of a vehicle to which a shift control system according to the embodiment of the invention is applied.

FIG. 1 is a block diagram of a system of a vehicle to which a shift control system according to the embodiment of the invention is applied.

As shown in FIG. 1, a shift lever 3 (see FIG. 3) selects a drive range ("D" range), a manual range ("M" range), a manual "+" range ("M+" range) and a manual "−" range ("M−" range). A change-over switch 7 switches a manual control and a limit line variable control and may be provided in a monitor of a navigation system mounted on a vehicle or may be provided in the shift lever 3. An ABS flag 9 outputs a signal for determining an inhibition of a limit line variable control at the time of activation of an ABS.

A CVT control unit 14 controls a gear ratio of a belttype type continuously variable transmission (CVT) 1 to achieve a target gear ratio. The CVT control unit 14 determines a target gear ratio from a shift map 2, and outputs a command of achieving the target gear ratio to a hydraulic control valve unit 15 acting as a gear ratio actuator. This CVT control unit 14 constitutes a servo system performing a feedback control so that an actual gear ratio coincides with a target gear ratio.

A shift range indicator 6 includes a limit line variable control selection condition indicator 8 and shows whether a limit line variable control is selected.

Figure 2:
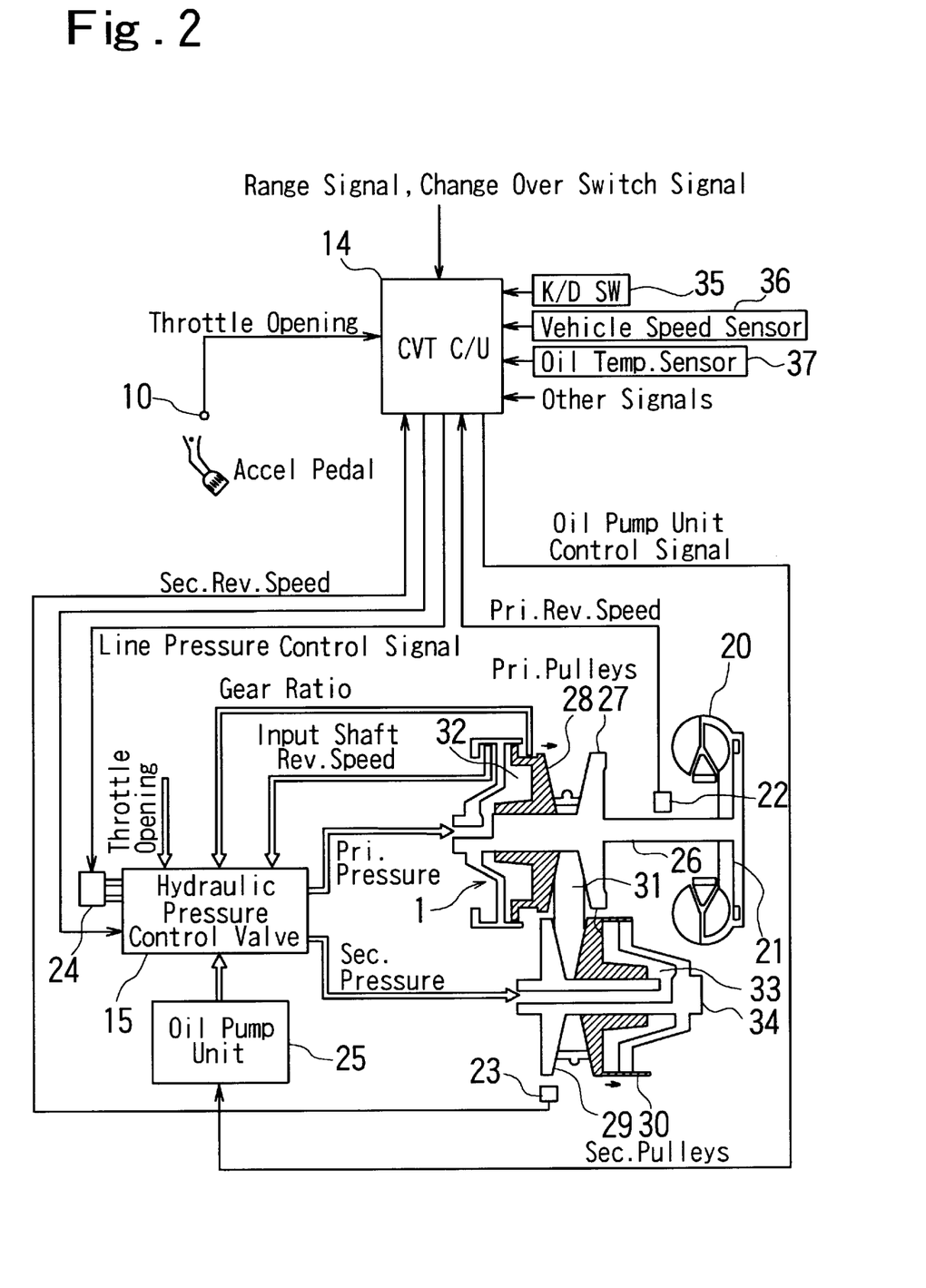
FIG. 2 is a diagram showing a belt-type continuously variable transmission and a shift control system according to the embodiment of the invention.

FIG. 2 is a diagram showing a belt-type continuously variable transmission and a shift control system according to the embodiment.

To an output shaft of the engine, there is coupled a torque converter 20 which includes a lock-up clutch 21 for connecting the engine and the belt-type CVT 1 directly by engagement.

The output side of the torque converter 20 is coupled to a transmission input shaft 26. One end of this input shaft 26 is provided with primary pulleys 27, 28 of the belt-type CVT 1.

The belt-type CVT 1 is comprised of the aforementioned primary pulleys 27, 28, secondary pulleys 29, 30 and a belt 31 transmitting torque of the primary pulleys 27, 28 to the secondary pulleys 29, 30. Of the primary pulleys 27, 28, a movable primary pulley 28 can be moved in the axial direction of the input shaft 26 by primary hydraulic pressure acting on a primary pulley cylinder chamber 32. Of the secondary pulleys 29, 30, a movable secondary pulley 30 can be moved in the axial direction of an output shaft 34 by secondary hydraulic pressure acting on a secondary pulley cylinder chamber 33. To the output shaft 34, there is firmly fitted a not-shown drive gear which drives a drive shaft extending to wheels via a pinion mounted on an idler shaft, a final gear and a differential gear unit.

By moving the movable primary pulley 28 and the movable secondary pulley 30 in their respective axial directions and changing radii of these pulleys coming into contact with the belt 31, a revolution speed ratio of the primary pulleys 27, 28 to the secondary pulleys 29, 30 (inverse of pulley ratio), that is, a gear ratio can be changed.

Since the secondary pulleys 29, 30 are provided to the output shaft 34 which is connected to the wheels, a revolution speed of the secondary pulleys 29, 30 is proportional to a vehicle speed. Therefore, in the CVT control unit 14 a target gear ratio is calculated based on the primary revolution speed (revolution speed of the primary pulleys) obtained from the shift map 2.

The control for changing the width of V-shaped pulley grooves of these primary pulleys 27, 28 and secondary pulleys 29, 30 is performed by supplying primary hydraulic pressure and secondary hydraulic pressure, which is produced by the hydraulic pressure control valve unit 15 in accordance with command from the CVT control unit 14, to the primary pulley cylinder chamber 32 and the second pulley cylinder chamber 33 respectively.

The CVT control unit 14 receives a limit line variable control command from the change-over switch 7. This CVT control unit 14 receives a throttle opening signal from a throttle opening sensor 10, a switch signal from a kick-down switch 35, a vehicle speed signal from a vehicle speed sensor 36, a transmission oil temperature signal from an oil temperature sensor 37, a primary revolution speed signal from a primary speed sensor 22, a secondary revolution speed signal from a secondary speed sensor 23, a range signal from the shift lever 3 and others. The CVT control unit 14 performs arithmetic processing on the basis of these input signals and outputs a line pressure control signal to a line pressure solenoid 24 and outputs a gear ratio control signal to the hydraulic pressure control valve unit 15 and outputs an oil pump unit control signal to an oil pump unit 25.

Figure 3:
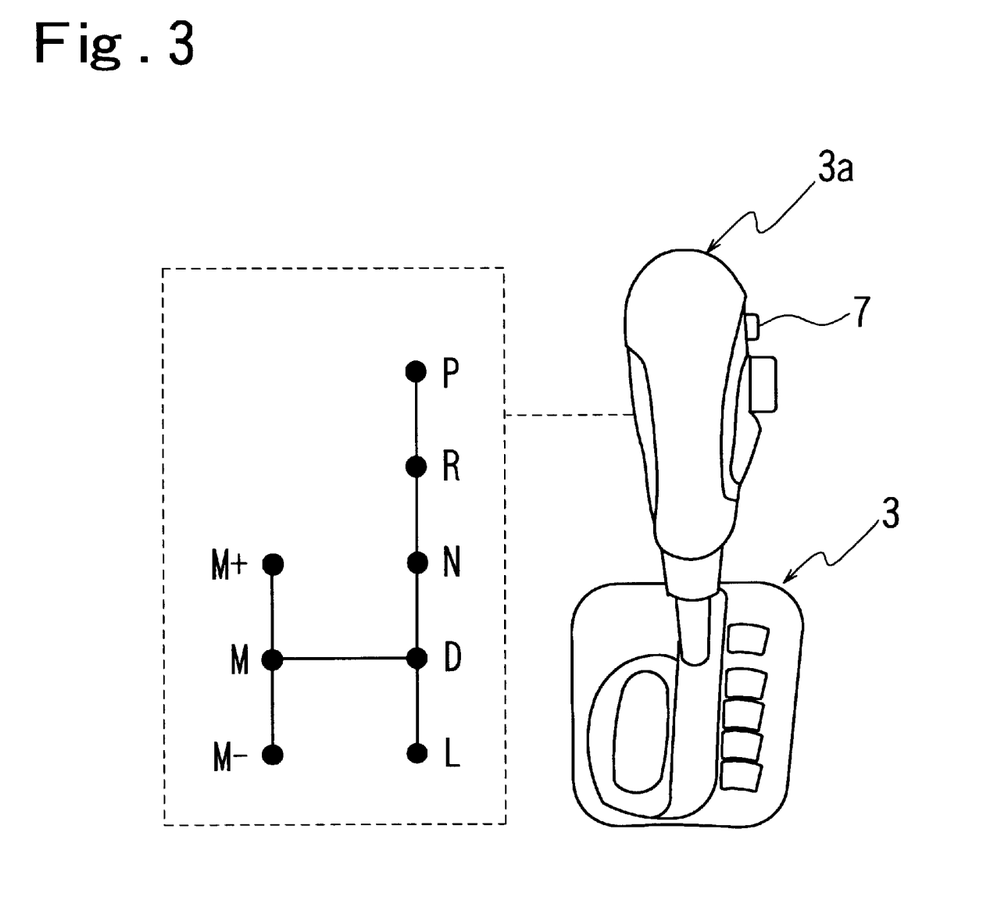
FIG. 3 is a schematic diagram of a shift lever according to the embodiment of the invention.

FIG. 3 is an enlarged view of the shift lever 3 according to the embodiment of the invention. The "M" range (manual mode) is selected by moving a shift knob 3a in a lateral direction from the "D" range position. The shift knob 3a has the change-over switch 7 for switching a normal manual mode to a limit line (a lower limit of gear ratio) variable mode. When this change-over switch 7 is ON, the shift knob 3a is moved to the "M+" range or the "M−" range so that a limit line of gear ratio can be varied.

Figure 5:
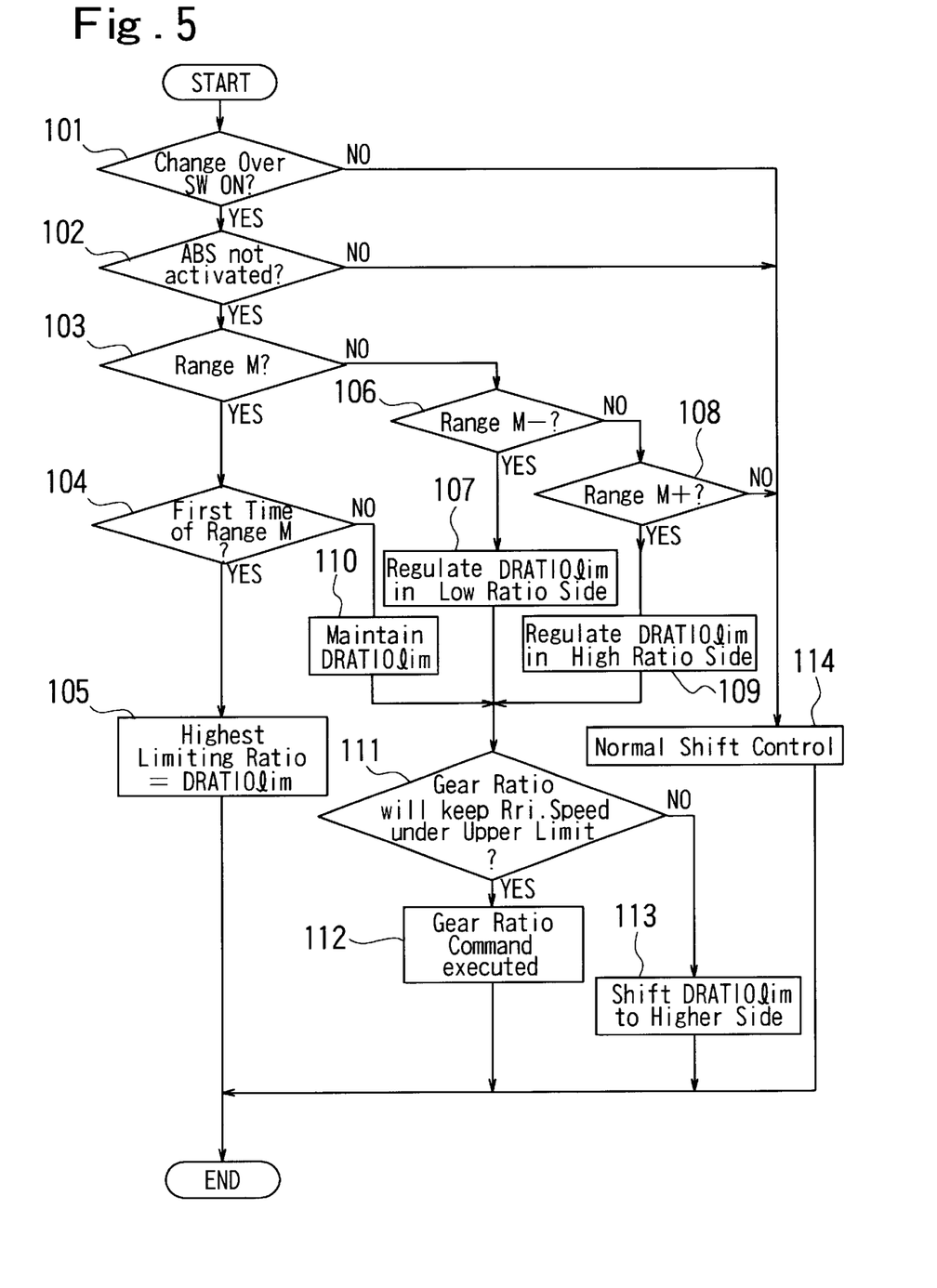
FIG. 5 is a flow chart showing a limit line variable control according to the embodiment of the invention.

FIG. 5 is a flow chart showing a limit line variable control by the CVT control unit 14 according to the embodiment of the invention.

Figure 8:
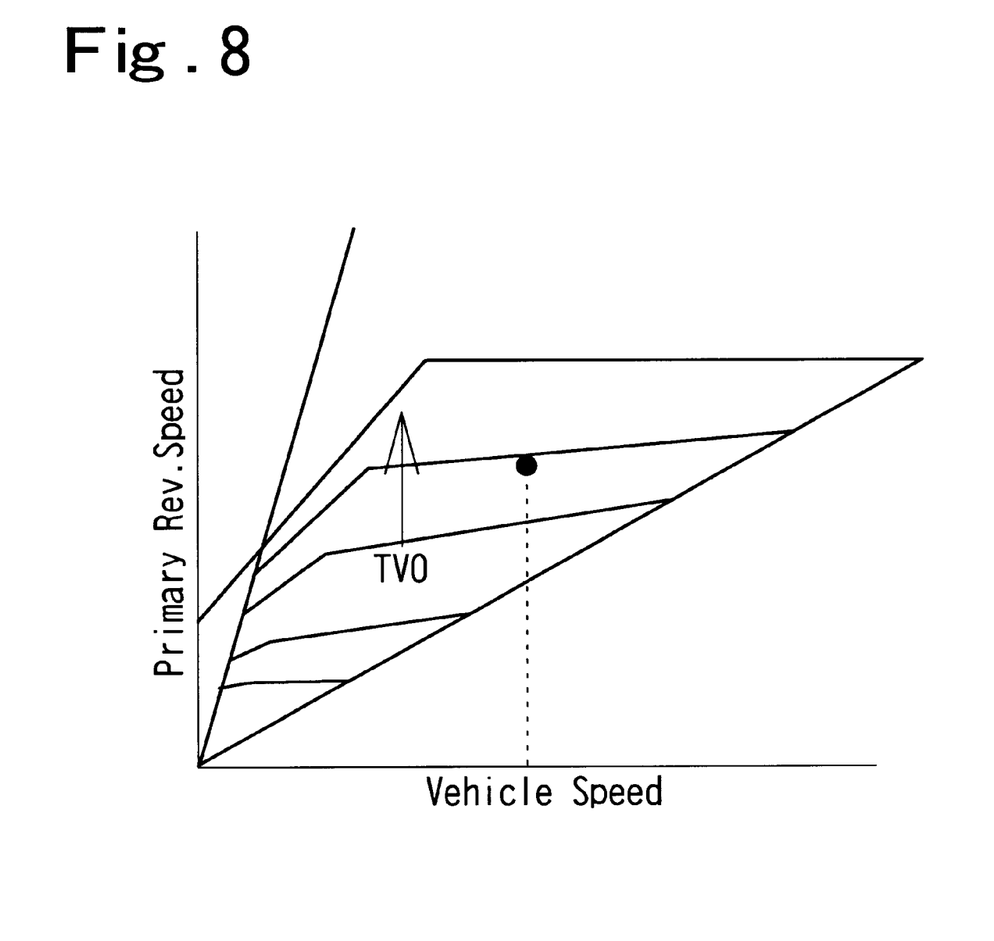
FIG. 8 is a shift map for an ordinary control in a "D" range according to the embodiment of the invention.
Figure 9:
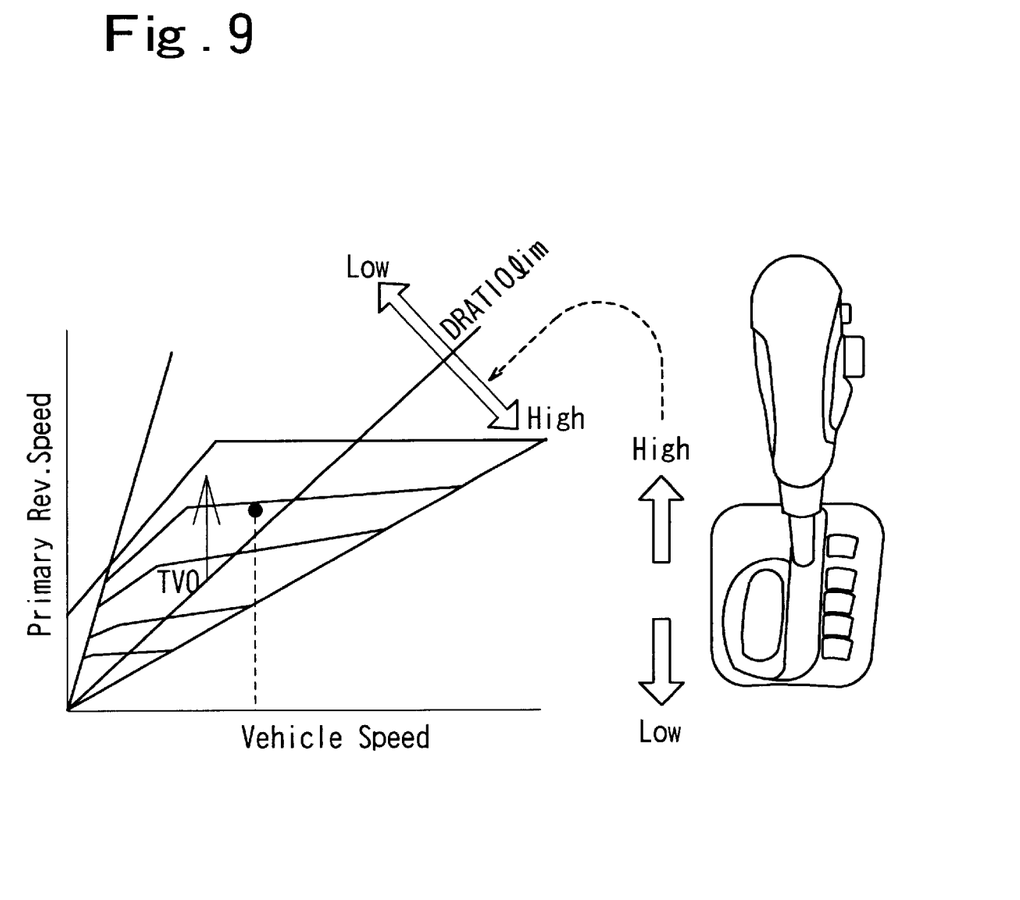
FIG. 9 is a shift map for a limit line variable control according to the embodiment of the invention.

At step 101, it is determined whether the change over switch 7 for a limit line variable control is turned on. If turned ON, the routine proceeds to step 102. If turned OFF, the routine proceeds to step 114, and a normal manual shift control using a shift map as shown in FIG. 8 is performed.

At the step 102, it is determined from the ABS flag 9 whether the ABS is not activated. If the result is affirmative, the routine proceeds to step 103. If the result is negative, the routine proceeds to the step 114.

At the step 103, it is determined whether a range signal produced by the shift lever 3 is indicative of the "M" range position (manual mode). If the result is affirmative, the routine proceeds to step 104. If the signal is indicative of other positions, the routine proceeds to the step 106.

At the step 104, it is determined whether the lever is positioned at the "M" range first time. If this is the case, the routine proceeds to step 105. If this is not the case, the routine proceeds to step 110.

At the step 105, a value DRATIOlim of a gear ratio for limiting a high ratio side of a "D" range shift line is set as a highest limiting ratio.

At the step 106, it is determined whether a range signal produced by the shift lever 3 is indicative of the "M−" range. If the result is affirmative, the routine proceeds to step 107. If the result is negative, the routine proceeds to step 108.

Figure 6:
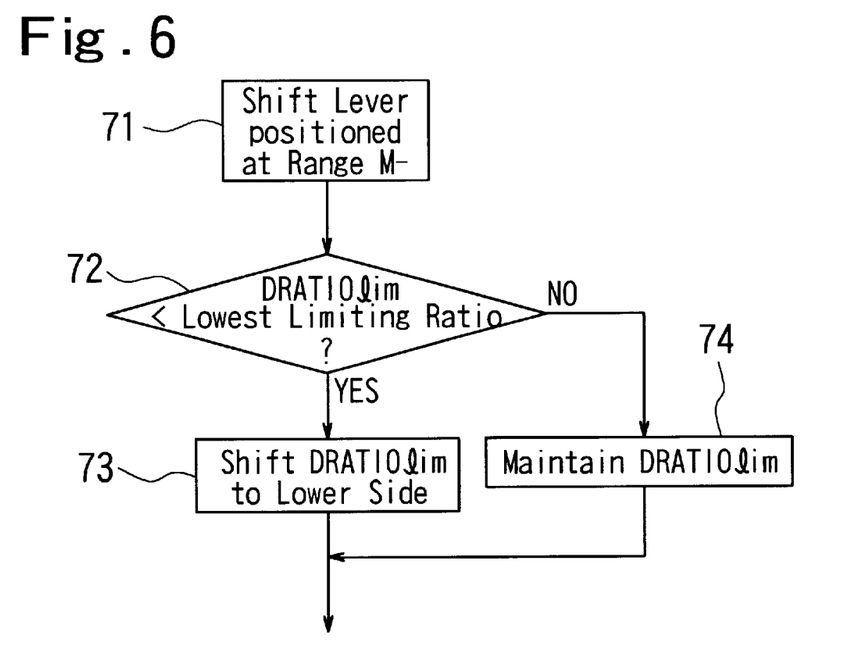
FIG. 6 is a flow chart showing a regulation control of a low ratio side according to the embodiment of the invention.
Figure 10:
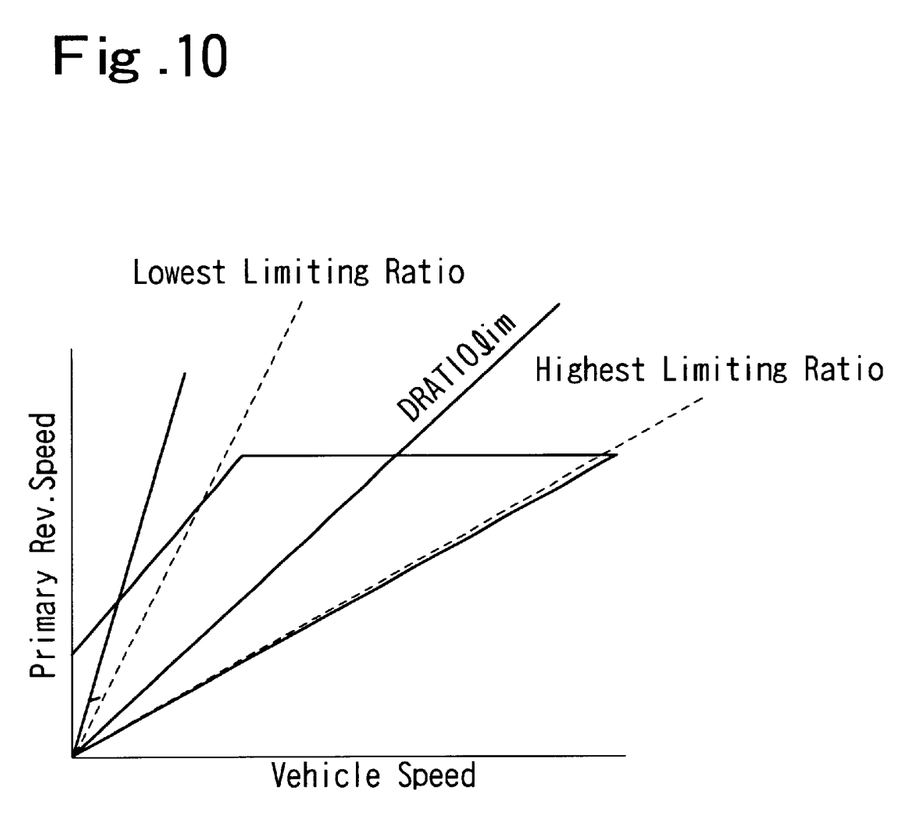
FIG. 10 is a shift map for a limit line variable control according to the embodiment of the invention.

At the step 107, a regulation control in a low ratio side is performed (see FIGS. 6 and 10).

At the step 108, it is determined whether a range signal produced by the shift lever 3 is indicative of the "M+" range. If the result is affirmative, the routine proceeds to step 109. If the result is negative, the routine proceeds to the step 114.

Figure 7:
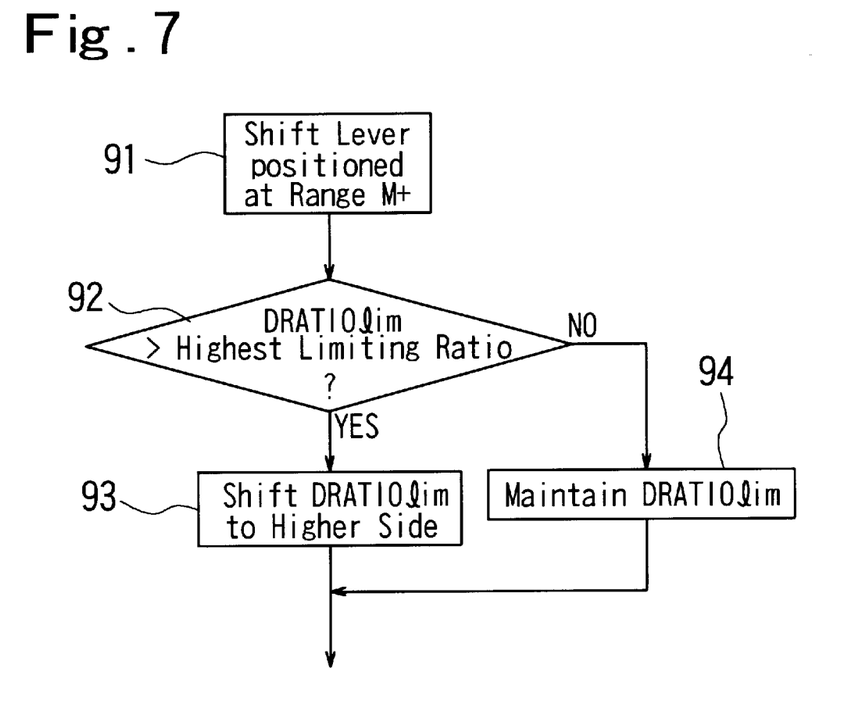
FIG. 7 is a flow chart showing a regulation control of a high ratio side according to the embodiment of the invention.

At the step 109, a regulation control in a high ratio side is performed (see FIGS. 7 and 10).

At the step 110, it is commanded to maintain the value DRATIOlim.

At step 111, it is determined whether the value of the gear ratio (DRATIOlim) is such that a primary revolution speed is kept under an upper limit value. If the result is affirmative, the routine proceeds to step 112. If the result is negative, the routine proceeds to step 113.

At the step 112, a gear ratio command is executed.

Figure 11A:
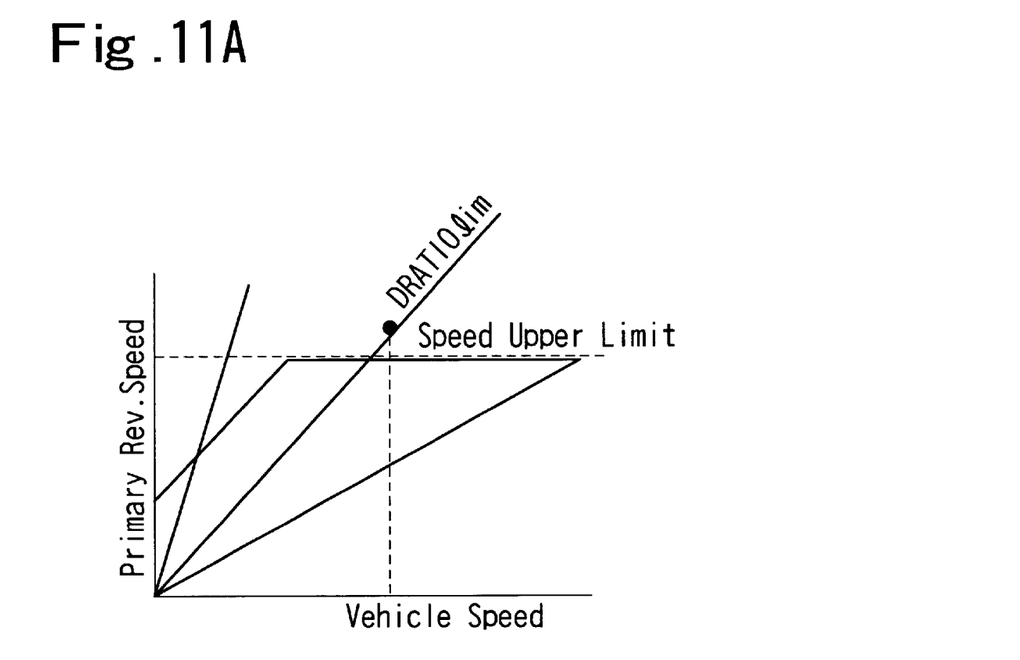
FIGS. 11A and 11B shows a change of limit line in a limit line variable control according to the embodiment of the invention.
Figure 11B:
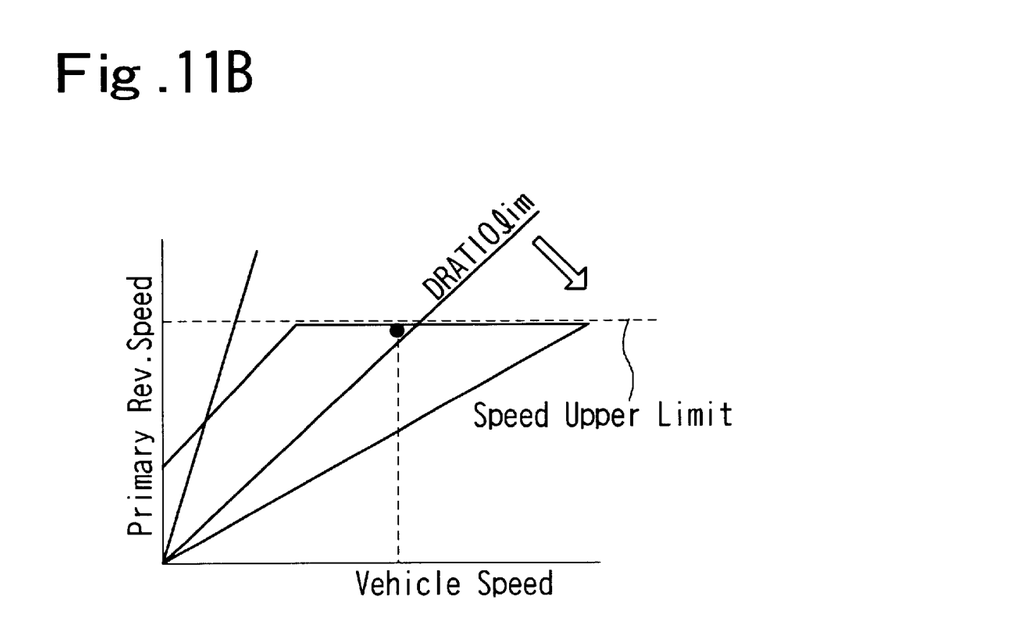

At the step 113, the value DRATIOlim is shifted to a high ratio side so that the primary revolution speed does not exceed the upper limit value (see FIG. 11B).

At the step 114, a normal shift control is performed. More specifically, if the change-over switch 7 for switching between a limit line variable control and a manual mode is turned ON, it is determined from the ABS flag whether the ABS is activated. This is aimed that the wheels can be prevented from being locked when engine braking force is applied by means of the regulation of limit lines. If the ABS is activated or the change-over switch 7 is OFF, a normal shift control is performed, as shown in FIG. 8.

When the ABS is not activated and the shift knob 3a is placed at the "M" range position, the number of times the shift knob 3a passed the "M" range position is checked. For instance, when the "D" range is switched to the "M" range and the lever 3 is not tilted neither toward the "M+" range nor toward the "M−" range, it is determined that the shift knob 3a passes the "M" range position first time. Also, if it is just after the ABS is activated, it is determined that the shift knob 3a passes the "M" range position first time.

If this is the case, a gear ratio DRATIOlim for limiting a high ratio side in the "D" range shift line is set as the highest limiting ratio. More specifically, if the driver turns the change-over switch 7 ON and merely selects the "M" range and never selects the "M+" range and the "M−" range, a gear ratio at that time is set as a highest gear ratio, and thereby shift shock at the time of switching controls can be eliminated.

Next, when it is determined that the shift lever 3 is placed at the "M−" range position, a regulation control on a low ratio side is performed as shown in FIG. 6. At step 72, it is determined whether the value DRATIOlim is less than a lowest limiting ratio. If the result is affirmative, the routine proceeds to step 73, and it is commanded to shift the value DRATIOlim to a low ratio side. If the result is negative, the value DRATIOlim is maintained in step 74. In short, even if the driver attempts to shift a limit line to a low ratio side, the value DRATIOlim is limited to the lowest limiting ratio so as to prevent the engine brake from working excessively.

Next, when it is determined that the shift lever 3 is placed at the "M+" range position, a regulation control of a high ratio side is performed as shown in FIG. 7. At step 92, it is determined whether the value DRATIOlim is more than the highest limiting ratio. If the result is affirmative, the routine proceeds to step 93 and it is commanded to shift the value DRATIOlim to a high ratio side. If the result is negative, the routine proceeds to step 94 to maintain the value DRATIOlim. More specifically, even if the driver attempts to shift the limit line to a high ratio side, the value DRATIOlim is limited to the highest limiting ratio, whereby a limit line can be prevented from being unnecessarily shifted to a higher ratio side than a shift range, as in the case where the value DRATIOlim is limited to the aforementioned lowest limiting ratio.

It is determined whether these maintained value DRATIOlim or shifted value DRATIOlim causes a primary revolution speed to exceed a speed upper limit as shown with a dot in FIG. 11A. If the result is negative, a gear ratio command is executed. If the result is affirmative, the value DRATIOlim is shifted to a high ratio side as shown by an arrow in FIG. 11B, not so as to exceed the speed upper limit of the primary revolution speed, while vehicle speed is maintained. Thereby, engine speed can be prevented from rising excessively.

Figure 4A:
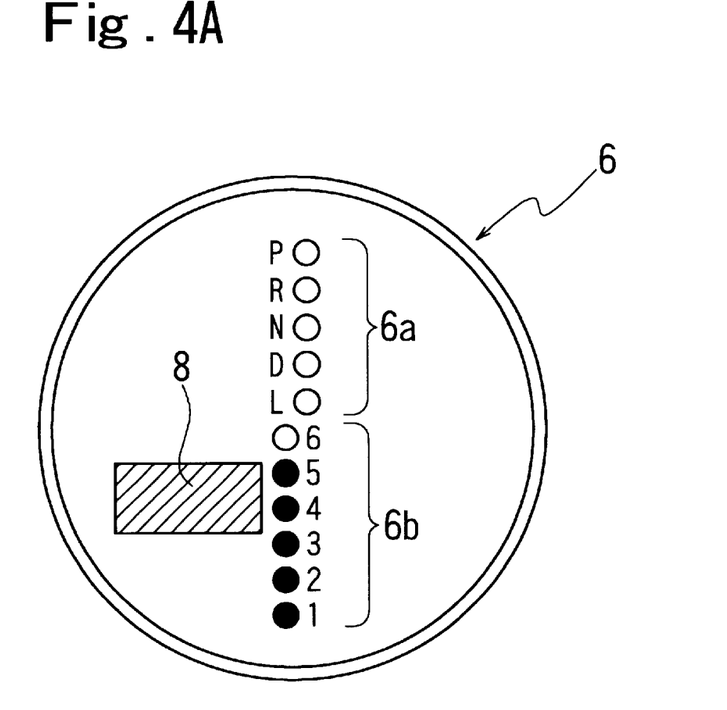
FIGS. 4A and 4B are diagrams showing a shift range indicator according to the embodiment of the invention.

As shown in FIG. 4A, the shift range indicator 6 is provided with a shift position indicator 6a for showing shift positions, a limit line variable control selection condition indicator 8 for showing whether a limit line variable control is selected, and a gear ratio indicator 6b for showing gear ratios.

By determining which gear ratio is close to the set value DRATIOlim, a shift range allowable in a limit line variable control is indicated. Thereby, the driver can recognize a position of a limit line and a shiftable range.

Figure 4B:
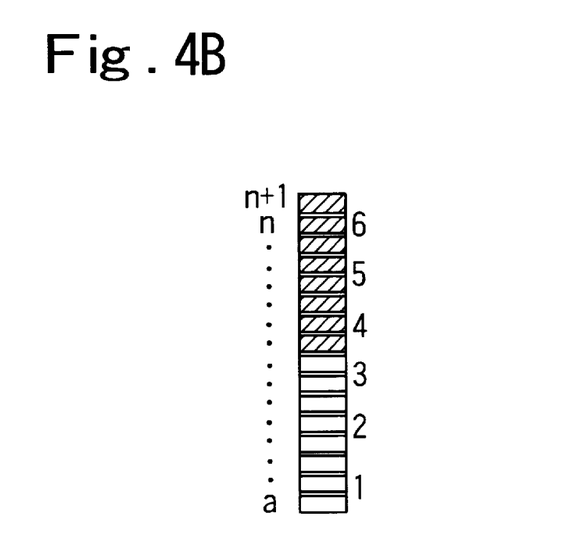

FIG. 4B shows another example of gear ratio indicator. In this example, the lamps are constituted with rectangular segment lamps "a" to "n+1", number of which is larger than that of the gear ratio indicator 6b in FIG. 4A. Therefore, the shift range allowable in a limit line variable control is more precisely indicated.

Figure 12:
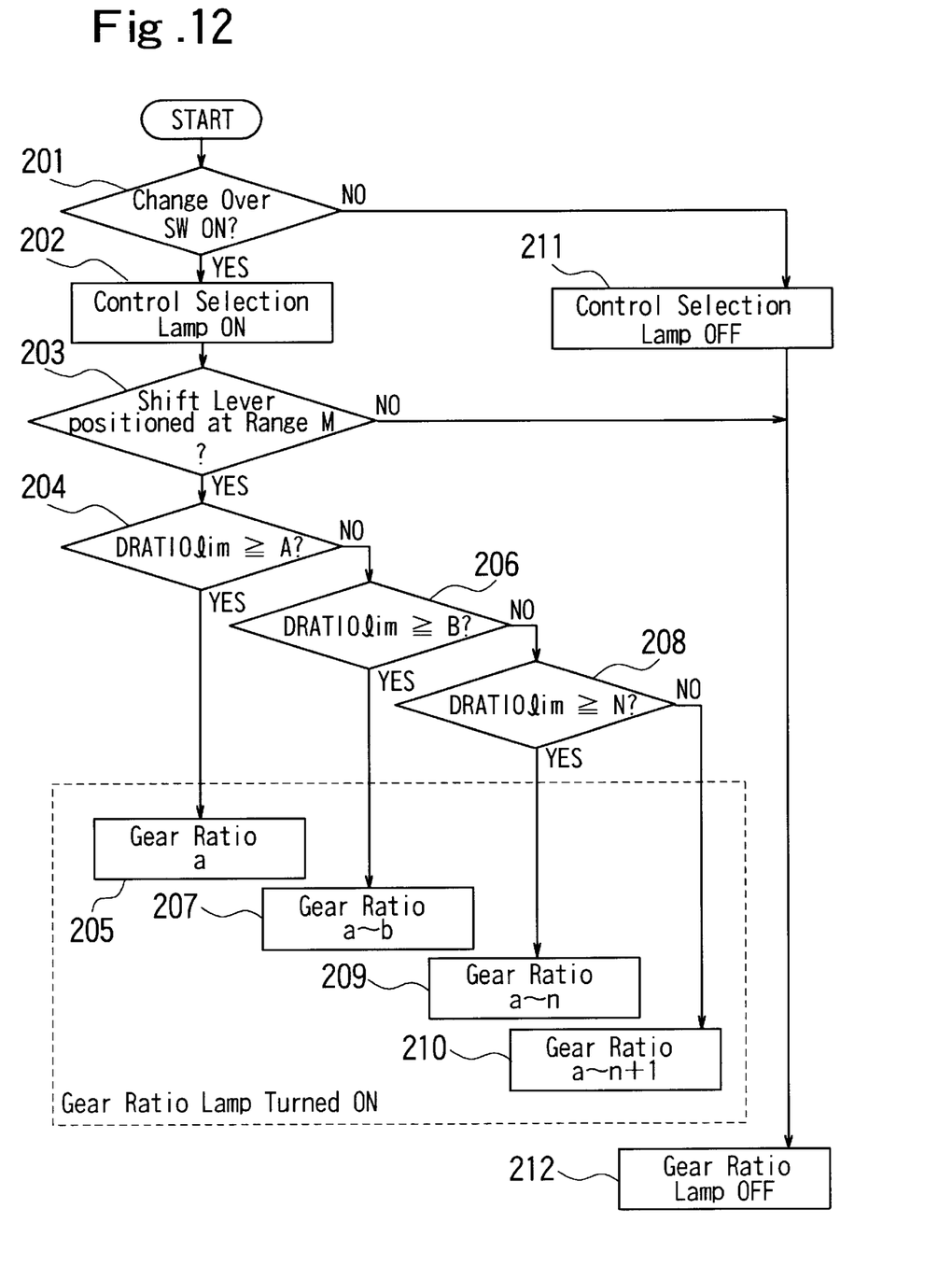
FIG. 12 is a flow chart showing a display control at the time of a limit line variable control according to the embodiment of the invention.

FIG. 12 is a flow chart showing a control of an indicating system of case where a limit line variable control is performed. Here, the gear ratio indicator shown in FIG. 4B is controlled.

At step 201, it is determined whether the change-over switch 7 is turned ON. If turned ON, the routine proceeds to step 202. If turned OFF, the routine proceeds to step 211.

At the step 202, a limit line variable control selection lamp is turned ON.

At step 203, it is determined whether the shift knob 3a is placed on the "M" range position. If the result is affirmative, the routine proceeds to step 204. If the result is negative, the routine proceeds to step 212.

At the step 204, it is determined whether the value DRATIOlim is more than a gear ratio A. If the result is affirmative, the routine proceeds to step 205 and the lamp "a" of a gear ratio indicator is turned on. If this is not the case, the routine proceeds to step 206.

At the step 206, it is determined whether the value DRATIOlim is more than a gear ratio B. If the result is affirmative, the routine proceeds to step 207 and the lamps "a"–"b" of the gear ratio indicator are turned on. Thereafter, such an operation is repeated, and lamps "a"–"n" of the gear ratio indicator are sequentially turned on according to the value DRATIOlim.

At step 211, the limit line variable control selection lamp is turned off. Then, the routine proceeds to step 212, and all lamps of the gear ratio indicator are turned off.

As described hereinbefore, in the shift control system of the continuously variable transmission according to the embodiment, there is provided in the shift map 2 a limit line for setting a lower limit for inhibiting a gear ratio from changing from a gear stage to an upshift side. The shift lever 3 can change the limit line to a downshift side or an upshift side.

The driver can set a limit line and change the limit line to a downshift side or an upshift side with the shift lever 3, thereby controlling a lower limit of a gear ratio. Therefore, if a limit line is set with respect to a gear ratio, a "D" range running can be performed on a lower ratio side than the set gear ratio. Since a normal running in the "D" range can be also performed, the driver's shift operation can be simplified. By the provision of the belt-type CVT 1, the driver can change the limit lines continuously while feeling desired engine braking force. Since shift operations are limited to the adjustments of engine braking force and others, this shift operation is not troublesome to the driver.

When an automatic shift control is changed to a limit line variable control, a gear ratio at that time is set as a limit line. Therefore shift shock at the time of changing controls can be prevented from occurring.

Since the lowest limiting ratio is provided to restrict a change range of a downshift side of a limit line, excessive engine brake can be prevented. Also, since the highest limiting ratio is provided to restrict a change range of an upshift side of a limit line, the limit line can be prevented from being unnecessarily changed to an upshift side rather than a shift range.

Further, there is provided a speed upper limit of the transmission input shaft within a change range of the limit line. When a vehicle speed is attained due to acceleration at a gear ratio selected within the change range and thereby the transmission input shaft speed reaches a speed upper limit, a limit line is prevented from changing to a downshift side that the selected gear ratio. As a result, even if the driver attempts to change a limit line in the state where engine speed is high, a so-called over rev, that is, a state where engine speed exceeds a predetermined speed, can be inhibited.

Since the shift range indicator 8 indicates a shiftable range to the driver when a limit line is variably controlled, the driver can recognize the position of a limit line and the shiftable range.

By providing the change-over switch 7 for switching a shift control in which a gear ratio is selected by the driver's shift operation and a limit variable control, the conventional manual shift control device as it is can be used as a changing section for a limit line variable control, and both the conventional manual range and the limit line variable control can be operated with a single shift lever.

Since the limit line variable control selection condition indicator 8 indicates whether a limit line variable control is selected, the driver can recognize that the limit line variable control is selected, even during the running in the "D" range.

Furthermore, with reference to the ABS flag 9, it is determined whether the anti-lock brake system is activated to avoid the locking of wheels at the time of a sudden braking or a slipping state of the wheels. By inhibiting a limit line variable control at the time of activation of the ABS, the wheels can be prevented from being locked due to an excessive engine braking force when the ABS is activated.

What is claimed is:

1. A shift control system for an automatic transmission which has a gear ratio control means for controlling gear ratio of said automatic transmission by determining a target gear ratio value from a drive point determined on the basis of at least a throttle opening and a vehicle speed, comprising:

a lower limit setting device provided in said gear ratio control means and setting a lower limit for inhibiting a gear ratio from changing to a gear ratio of an upshift side; and a lower limit variable control means in which a lower limit of said gear ratio can be changed to a downshift side or to an upshift side by an operation of a driver.

2. A shift control system for an automatic transmission according to claim 1, wherein a shift control state can be changed over between first state in which an automatic shift can be performed regardless of said lower limit and second state in which an automatic shift can be performed within a gear ratio range which is not below said lower limit can be changed.

3. A shift control system for an automatic transmission according to claim 2, wherein said lower limit setting device of said gear ratio control means sets a gear ratio at the time of changing from said first state in which an automatic shift can be performed regardless of said lower limit into said second in which an automatic shift can be performed within a gear ratio range which is not below said lower limit, as a lower limit.

4. A shift control system for an automatic transmission according to one of claims 1 to 3, wherein
said lower limit variable control means includes a lowest side limiting ratio for restricting a change range of a downshift side of a lower limit, a highest side limiting ratio for restricting a change range of an upshift side of a lower limit and a speed upper limit of a transmission input shaft within a change range of a lower limit, and when a speed of the transmission input shaft reaches said speed upper limit due to a gear ratio selected within said change range, said lower limit variable control means inhibits said lower limit from shifting from the selected gear ratio to a gear ratio of a downshift side, and when a speed of said transmission input shaft exceeds said speed upper limit, said lower limit variable control means shifts said lower limit to a gear ratio of an upshift side that does not cause the speed of said transmission input shaft to exceed said speed upper limit.

5. A shift control system for an automatic transmission according to one of claims 1 to 3, further comprising:
a speed changeable range indicating means for indicating an allowable shift range to a driver when said lower limit variable control means controls a lower limit variably.

6. A shift control system for an automatic transmission according to one of claims 1 to 3, further comprising:
a gear ratio selecting means capable of selecting gear ratios by the driver's shift operation, and changeable a lower limit for said lower limit variable control means by the shift operation thereof; and
a switching means for switching between a shift control by said gear ratio selecting means according to said shift operation and a shift control by said lower limit variable control means according to said shift operation.

7. A shift control system for an automatic transmission according to one of claims 1 to 3, further comprising:
a selection condition indicating means for indicating whether said lower limit variable control is selected.

8. A shift control system for an automatic transmission according to one of claims 1 to 3, wherein
said lower limit variable control means inhibits a lower limit variable control at the time of activation of an anti lock brake system for preventing wheels from being locked or slipping due to the drivers hard braking.

9. A shift control system for an automatic transmission according to one of claims 1 to 3, wherein
said automatic transmission is a continuously variable transmission for selecting gear ratios continuously; and
said lower limit variable control means changes a lower limit continuously in case where a lower limit change operation is continued for a certain period of time by the driver at the time of change of a lower limit of a gear ratio.

* * * * *

UNITED STATES PATENT AND TRADEMARK OFFICE
CERTIFICATE OF CORRECTION

PATENT NO.    : 6,514,174 B2
DATED         : February 4, 2003
INVENTOR(S)   : Toshiji Iida et al.

It is certified that error appears in the above-identified patent and that said Letters Patent is hereby corrected as shown below:

<u>Title page,</u>
Item [30], Foreign Application Priority Data, please change "Aug 20, 2000" to -- Aug 2, 2000 --.
Item [56], References Cited, please change "6,418,236 B1" to -- 6,418,367 --.

Signed and Sealed this

Tenth Day of June, 2003

JAMES E. ROGAN
*Director of the United States Patent and Trademark Office*